United States Patent
Shimizu et al.

[11] Patent Number: 5,995,188
[45] Date of Patent: Nov. 30, 1999

[54] LIQUID CRYSTAL DISPLAY DEVICE USING STACKED LAYERS

[75] Inventors: Seizaburo Shimizu; Hiroki Iwanaga, both of Yokohama; Katsuyuki Naito, Tokyo; Kazuyuki Sunohara, Yokohama; Shintaro Enomoto, Yokohama; Atsushi Sugahara, Yokohama, all of Japan

[73] Assignee: Kabushiki Kaisha Toshiba, Kawasaki, Japan

[21] Appl. No.: 09/009,741

[22] Filed: Jan. 20, 1998

[30] Foreign Application Priority Data

Jan. 23, 1997 [JP] Japan .................................. 9-010488
Dec. 18, 1997 [JP] Japan .................................. 9-349357

[51] Int. Cl.$^6$ .................................................. G02F 1/1343
[52] U.S. Cl. ............................... 349/147; 349/74; 349/77
[58] Field of Search ................................. 349/74, 77, 78, 349/79, 80, 81, 82, 147

[56] References Cited

U.S. PATENT DOCUMENTS 5,625,474  4/1997  Aomori et al. ......................... 349/139
5,712,695  1/1998  Tanaka et al. ......................... 349/139

FOREIGN PATENT DOCUMENTS 6-337643  12/1994  Japan .

OTHER PUBLICATIONS

K. Sunohara et al. "A Reflective Color LCD Using Three–Layer GH–Mode" SID 96 Digest, pp. 103–106 (1996).
Y. Nakai, et al., "A Reflective Tri–Layer Guest–Host Color TFT–LCD" SID 97 Digest, pp. 83–86 (1997).

Primary Examiner—William L. Sikes
Assistant Examiner—James A Dudek
Attorney, Agent, or Firm—Finnegan, Henderson, Farabow, Garrett & Dunner, L.L.P.

[57] ABSTRACT

The liquid crystal display device comprises a first substrate, a second substrate opposite to the first substrate, a plurality of switching elements formed on a face of the first substrate, which is opposite to the second substrate, a common electrode formed on a face of the second substrate, the face being opposite to the first substrate, a plurality of liquid crystal layers stacked on the second substrate to hold the common electrode between the layers and the second substrate, and arranged between the first and second substrates a plurality of projection electrodes selectively formed on the liquid crystal layers and a plurality of pixel electrode each formed on a corresponding one of the liquid crystal layers. The pixel electrodes respectively formed between a corresponding couple of the liquid crystal layers are connected to a corresponding one of the switching elements formed on the first substrate through one or several of the protrusion electrode/ electrodes. The several protrusion electrodes are brought into contact at each of the boundaries of the adjacent liquid crystal layers and connected in cascade.

6 Claims, 7 Drawing Sheets

LIQUID CRYSTAL DISPLAY DEVICE USING STACKED LAYERS

BACKGROUND OF THE INVENTION

This invention relates to a liquid crystal display device and the manufacturing method thereof, in particular, to a liquid crystal display device having a plurality of liquid crystal layers stacked in order and the manufacturing method thereof.

The CRT (Cathode Ray Tube) display is the most popular display device used in the present time. The CRT display, however, displays all the pixels with use of one electron gun, and thus needs to have a large depth. In addition, the CRT display is so heavy and consumes so much electric power that the CRT display is not suitable as a display device of a mobile apparatus. The other display devices than the CRT display such as a plasma display device and an EL(Electro-Luminescence) display device which are now distributed in the market respectively have problems in a practical use as a mobile display device.

The liquid crystal display device is thus only one device now practically used as a display device of a mobile apparatus. The liquid crystal display device is so thin and can be driven with low electric power consumption, and thus is widely used as a display device of a mobile apparatus such as a watch and a pocket calculator. Particularly, a TN (Twisted Nematic) liquid crystal display device is incorporated with an active switching device such as a TFT (Thin Film Transistor), and thus has so good display characteristics equal to the CRT display to be used for a television. The TN liquid crystal display device, however, uses polarizers and thus has low light utilization efficiency. In order to securely obtain sufficient light to display an image, the TN liquid crystal display device needs to be provided with a backlight, which consumes a large amount of electric power.

The liquid crystal display device such as a GH (Guest Host) type liquid crystal display device using dichromatic pigment and a cholesteric selective reflection type liquid crystal display device are used as a reflective type liquid crystal display device, which needs no polarizer. In order to attain a full-color display by using the GH type liquid crystal display device, however, each sub-pixel of the display needs to be provided with liquid crystal materials different from each other in color. However, it is practically difficult to arrange such several types of liquid crystal materials in a plane. The full-color display can be also attained by stacking more than three layers of liquid crystal cells. However, when more than three layers of liquid crystal cells are stacked, various problems in a practical manufacturing process occur: the assembly of the cells, the injection of the liquid crystal material in each cells, and the mounting of the driving transistor cannot be performed with ease. The similar problems occur in using the cholesteric selective reflection type liquid crystal display device.

The full-color display can be theoretically attained by these types of the liquid crystal display devices which use no polarizer by stacking three substrates (hereinafter referred to "TFT substrates") on each of which TFTs as driving elements are mounted, and then by forming a liquid crystal layer on each TFT substrate. However, both the manufacturing cost and the weight of such a full-color display device having three TFT substrates will increase. In order to obtain a full-color display device with one TFT substrate, via conductors for connecting the liquid crystal layers on the TFT substrate each other need to be formed to reliably connect each pixel electrode and a TFT to each other.

One of the methods for attaining the full-color display by the liquid crystal device having no polarizer and only one TFT substrate has been proposed by the Jpn. Pat. KOKAI Appln. No. 6-337643. According to this method, three liquid crystal layers are stacked on one TFT substrate such that each of the liquid crystal layers holds a transparent pixel electrode between the substrate or the lower liquid crystal layers and itself, and via conductors for connecting these transparent pixel electrodes to the electrodes of the TFTs are formed by the sputtering or the printing technique in via holes which are formed in the liquid crystal layers by performing the etching thereon.

The plating technique can be also employed to form the via conductors, but the process thereof is so complicated that the number of the steps will increase. Particularly, if the etching or plating is performed after forming the liquid crystal layers, impurity ions may be introduced into the liquid crystal layers, which deteriorates the reliability of the display device. In addition, the device having the via conductors formed by the plating technique has so much connections that the failure in connection may easily occur and even disconnection may occur due to the change in temperature.

As described above, the conventional liquid crystal display device, particularly the full-color display device has so many problems in view of the manufacturing process.

BRIEF SUMMARY OF THE INVENTION

The object of the present invention is to provide a liquid crystal display device capable of being easily manufactured and having high reliability, and the manufacturing method thereof.

In order to attain the above object, the liquid crystal display device of the present invention comprises: a first substrate; a second substrate opposite to the first substrate; n switching elements formed on a face of the first substrate, which is opposite to the second substrate, where $n \geq 2$; a common electrode formed on a face of the second substrate, the face being opposite to the first substrate; n liquid crystal layers stacked on the second substrate with the common electrode intervening between the layers and the second substrate, the n liquid crystal layers being arranged between the first and the second substrate; a plurality of projection electrodes selectively formed on the n liquid crystal layers; and n pixel electrodes each formed on a corresponding one of the liquid crystal layers, one of the n pixel electrodes, which is formed on nth one of the liquid crystal layers, being directly connected to a corresponding one of the n switching elements, the others of the pixel electrodes each being connected to a corresponding one of switching elements other than that directly connected to the one of the pixel electrodes, via corresponding ones of the projection electrodes, which are connected in cascade, wherein first one of the n liquid crystal layers is formed on the common electrode, which is provided thereon with other one of the n pixel electrodes and one of the projection electrodes, which is connected to the other one of n pixel electrodes, nth one of the liquid crystal layers and (n−1) of the projection electrodes are formed on (n−1)th one of the liquid crystal layers, the (n−1) projection electrodes are each directly connected to a corresponding one of the (n−1) switching elements other than that directly connected to the nth one of the pixel electrodes, and (n−1) of the projection electrodes formed on the (n−1)th liquid crystal layer contact with (n−2) of the projection electrodes formed on (n−2)th one of the liquid crystal layer so as to be connected in cascade.

The liquid crystal display device further comprises (n−1) insulating layers respectively arranged between a corresponding couple of the liquid crystal layers, wherein the predetermined projection electrode may be connected in cascade to the pixel electrode via holes formed in the insulating layers.

The liquid crystal layer each preferably includes the liquid crystal contained in microcapsles formed of polymer.

The number "n" is 3, and the liquid crystal layer can include liquid crystals respectively added with dichromatic pigment of one of yellow, cyan and magenta.

The projection electrode may be formed of metal in a bump shape.

The projection electrode may be formed of metal in a column shape.

The projection electrode may be formed of conductive resin in a column shape.

According to the first aspect of the manufacturing method of the liquid crystal display device of the present invention, comprises the steps of: forming a plurality of semifinished substrates, the step including substeps each performed for each of the semifinished substrates, the substeps comprises: forming on a dummy substrate at least a surface of which is formed of conductive material an insulating layer having via holes; forming buried electrodes in the via holes by electroplating; forming projection electrodes on the buried electrodes and on the insulating film at surroundings thereof by electroplating; forming a pixel electrode to be connected to one of the projection electrodes on the insulating layer; forming a predetermined liquid crystal layer on the dummy substrate on which the insulating layer, the buried electrodes, the projection electrodes, and the pixel electrode are formed; preparing a first substrate on which a plurality of switching elements are formed; preparing a second substrate on which a transparent electrode having a second liquid crystal layer thereon; adhering a first semifinished substrate and the first substrate such that each of the plurality of switching elements is connected to a corresponding one of the projection electrodes formed on the first semifinished substrate; peeling the dummy substrate off from the first semifinished substrate; adhering the first one of the semifinished substrates and the second one of the semifinished substrates, the adhering step including the substeps of: bringing the buried electrodes and corresponding ones of the projection electrodes of the first one and the second one of the semifinished substrates in contact at the via holes to connect to each other, and peeling off the dummy substrate of the second one of the semifinished substrates after the buried electrodes and the corresponding one of the projection electrodes are connected to each other; repeating the substeps of adhering a corresponding couple of the plurality of semifinished substrates and removing the dummy substrate thereof, for each of the semifinished substrates other than the first and the second one of the semifinished substrates; and adhering the second substrate on a face of which the common electrode and the second liquid crystal layer are formed to a last one of the semifinished substrates which is adhered to a former one of the semifinished substrates and from which the dummy substrate thereof is peeled off.

The forming step of the plurality of semifinished substrates can include substeps of: forming an insulating layer having via holes on a dummy substrate at least surface of which is formed of conductive material; forming buried electrodes in the via holes by electroplating and forming projection electrodes on the buried electrodes and on the insulating layer at surroundings thereof by electroplating; and forming a pixel electrode connected to one of the projection electrodes on the insulating layer, after the substep of forming the projection electrodes.

The step of forming the plurality of semifinished substrate can include substeps of forming an insulating layer having via holes on a dummy substrate at least surface of which is formed of conductive material; forming buried electrodes in the via holes by electroplating after the substep of forming the insulating layer; forming a pixel electrode on the insulating layer, after the step of forming the buried electrodes; and forming projection electrodes on the buried electrodes and on the insulating layer at surroundings thereof by electroplating, and simultaneously, connecting the pixel electrode and one of the projection electrodes.

The insulating layer is preferably formed of photosensitive resin including one of compounds selected from a group of polyimide, epoxy, polyester, and polyolefin.

The substep of forming the buried electrodes can include a substep of forming the buried electrodes of one of elements selected from a group of nickel, copper, gold, silver, and solder by electroplating.

The substep of forming the projection electrodes can include a substep of forming the projection electrodes of one of elements selected from a group of nickel, copper, gold, silver, and solder by electroplating or electroless plating.

The substep of forming the liquid crystal layer preferably include a substep of printing liquid crystal contained in microcapsles formed of polymer.

According to the second aspect of the present invention, the manufacturing method of the liquid crystal display device, comprises the steps of: forming a plurality of switching elements and a reflection pixel electrode on a first substrate; forming a resist mask on the first substrate and then exposing only a electrode section of each of the switching elements; forming column electrodes on the electrode section of each of the switching elements; forming a first liquid crystal layer after the resist mask is removed; forming a common electrode on a second substrate; forming a second liquid crystal layer on the second substrate with the common electrode intervening therebetween; forming a pixel electrode on the second substrate on which the second liquid crystal layer is formed; selectively forming a conductive resin bump on the second substrate on which the pixel electrode is formed; forming the third liquid crystal layer on the second substrate on which the conductive resin bump is formed such that the tip of the conductive resin bump protrudes; and adhering the first and the second substrate by aligning a corresponding one of the column electrodes on the first substrate to the conductive resin bump on the second substrate.

The manufacturing method of the liquid crystal display device further comprises a step of depositing the metal to be electroplated on the first substrate after the step of forming the plurality of the switching elements and the reflection pixel electrode, and in the step of forming the column electrodes, the column electrodes can be formed by the electroplating on the electrode section of the switching element.

The step of forming the column electrodes can include a step of printing conductive resin on the electrode section of the switching element.

The step of forming the column electrodes preferably further comprises a step of making heights of the column electrodes equal by polishing the column electrodes.

The first, the second, and the third liquid crystal layer can arbitrarily corresponds to combination of three types of liquid crystal layers respectively containing yellow, cyan, and magenta dichromatic pigment.

The step of forming the first, the second, and the third liquid crystal layer preferably includes a step of printing liquid crystal contained in microcapsles of polymer.

According to the above-mentioned manufacturing methods, the switching elements are formed only the first substrate. When substrates each of which has a liquid crystal layer thereon are stacked on the first substrate in order, the crystal layers are formed on a substrate on which a via conductor is formed in advance. According to the other aspect of this method, conductive resin bumps (i.e., via conductors) are formed on the liquid crystal layers by printing to form a semifinished substrate, and a plurality of the semifinished substrates are stacked to selectively contact the via conductors. Therefore, according to the present invention, a matrix type liquid crystal display device having high reliability and capable of being easily manufactured.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 4A–4C specifically show the peeling method of the dummy substrate shown in FIG. 2F.

DETAILED DESCRIPTION OF THE INVENTION

The embodiment of the present invention will be described below with reference to the drawings.

Figure 1:
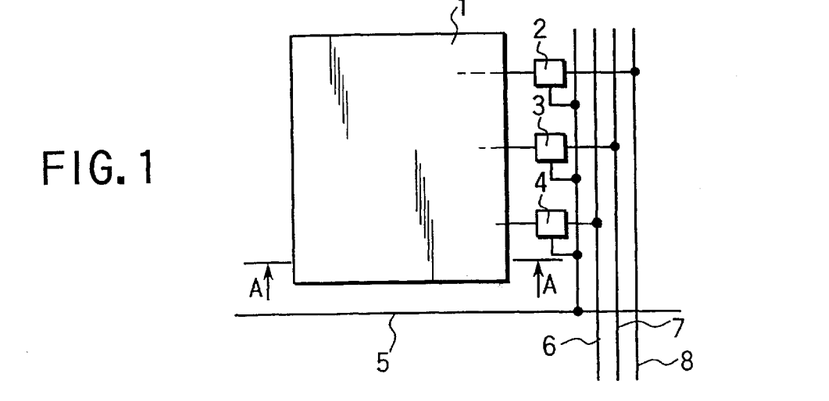
FIG. 1 is a schematic plane view of one pixel of a stacked type liquid crystal display device.

FIG. 1 is a schematic plane view of one pixel of a conventional active matrix color liquid crystal display device wherein one pixel is constituted by stacking three layers (three layers respectively having different colors). In FIG. 1, 1 denotes a pixel, 2–4 denote switching elements (TFTs), 5 denotes a signal line, and 6–8 denote gate lines (address lines) corresponding to the TFTs 2–4. The switching elements (TFTS) 2–4 and the gate lines 6–8 are schematically drawn in this drawing to simplify the description though they are not arranged as shown in the drawing, in fact.

FIGS. 2A–2H are sectional views of one pixel of the liquid crystal display device shown in FIG. 1, taken along a line A—A, for showing the basic manufacturing steps of the device according to the first aspect of the present invention, in order.

Figure 2A:
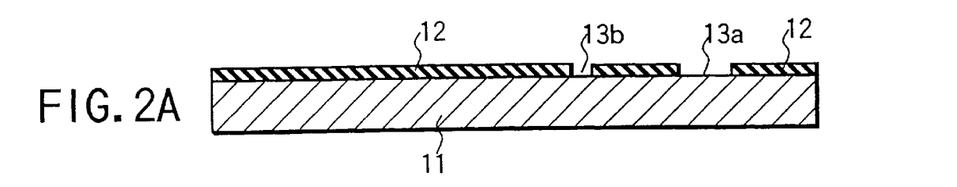
FIGS. 2A–2H are sectional views of the liquid crystal display device according to the first aspect of the present invention, which show the basic manufacturing steps of the device.

As shown in FIG. 2A, photosensitive resin 12 is applied to the surface of a dummy substrate 11, and then exposed to light to form holes 13a and 13b in which through electrodes (via conductors) are formed. By forming the hole 13a a little larger than the hole 13b in this time, the reliability of the cascade connection of bumps which will be formed in the hole 13a in the subsequent step, can be improved.

As the photosensitive resin 12, such material as photosensitive polyimide, photosensitive epoxy, photosensitive polyester, or photosensitive polyolefen which uses double bond of acryl or the like can be used to be applied to the dummy substrate 11. In view of reducing the influence to the driving voltage of the LCD, it is preferable to apply the photosensitive resin 12 possibly thin, but in view of the protection of the liquid crystal layer to be formed later, the resin possibly is preferable to be applied thick. In consideration of these two aspects, the suitable thickness of the photosensitive resin 12 is 1–10 $\mu$m, with some deviation in accordance with the type of the resin.

The dummy substrate 11 needs to have a surface functioning as an electroplating electrode for electroplating nickel, silver, or chrominium, and easy to be peeled off from an electroplated layer: a substrate formed of stainless steel or nickel, which can be easily peeled off and conductive, or a substrate formed of some suitable material having a conductive electrode layer easy to be peeled off thereon.

Figure 2B:
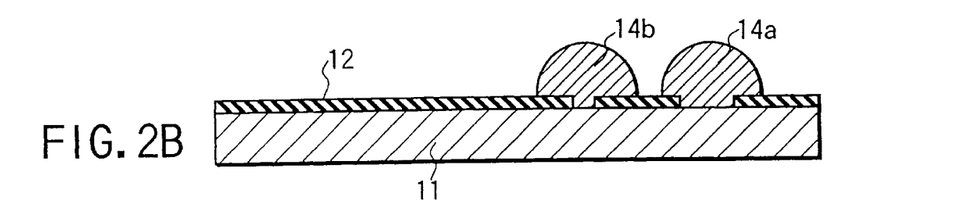

Next, as shown in FIG. 2B, the electroplating is performed by applying an electric current from the side of the dummy substrate 11, to fill the holes 13a and 13b and form the bumps 14a and 14b thereon and on the surroundings. The bumps 14a and 14b are formed of a metal material such as nickel, copper, gold, silver, or solder by the electroplating technique. When the bumps 14a and 14b are formed of the other material than solder, the bumps may be plated with solder on the surfaces thereof.

When the current density in the surface of the dummy substrate 11 is not uniform in forming the bumps 14a and 14b, the resultant bumps may vary in height. Such bumps are preferably polished to make the height even. The height of the bumps 14a and 14b can be made even also by performing an electroless plating using nickel, gold, or copper. The bumps formed by the electroless plating has low bulk density and thus can be also expected to have spring effect.

Figure 2C:
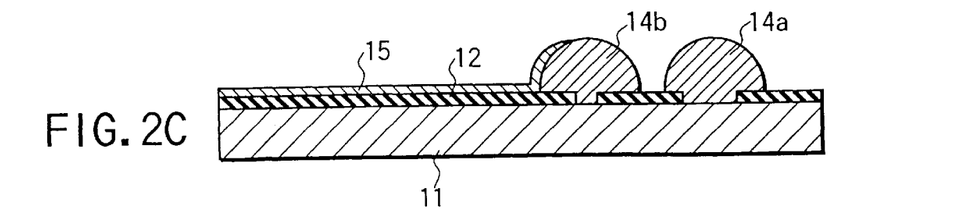

Next, as shown in FIG. 2C, transparent conductive material is deposited on an entire surface of the device by the deposition or sputtering technique, and patterned to form a pixel electrode 15. To form the pixel electrode 15, such a material as indium tin oxide, tin oxide, zinc oxide, or tin zinc oxide, is used as the transparent conductive material.

Figure 2D:
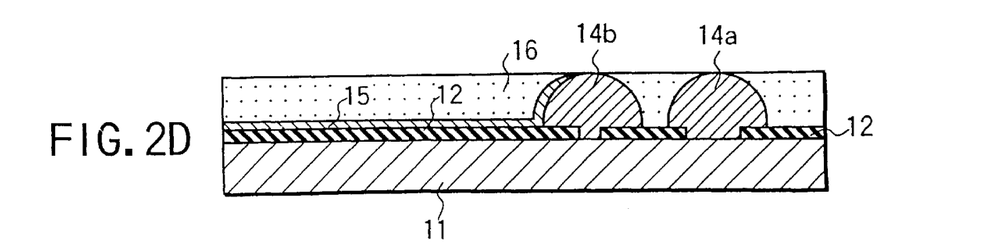

Subsequently, as shown in FIG. 2D, a liquid crystal layer 16 are applied thereto by printing. In this time, liquid crystal capsules, each having a diameter of 3–10 μm and made of a high polymer ball in which guest-host type liquid crystal containing yellow, magenta, or cyan dichromatic pigment is sealed, is used as the liquid crystal to be applied. By printing the liquid crystal capsules dispersed in water on the substrate and drying up it, the capsules are adhered to each other to form a liquid crystal film 16. The liquid crystal layer 16 needs to be formed in such a manner that the tips of the bumps 14a and 14b are exposed. When the tips of the bumps are contaminated by the polymer for making the liquid crystal capsules adhere to each other, the contaminated layer is removed by a cleaning, polishing, laser processing, or etching technique.

In such a manner as described above, a semifinished substrate in which the bumps 14a and 14b and the liquid crystal layer 16 are formed is obtained, as shown in FIG. 2D.

The semifinished substrate can be formed by the other method than the method described above. This method will be described below with reference to FIGS. 3A–3E. Throughout FIGS. 3A–3E, the same reference numerals as in FIGS. 2A–2H are used to designate the same elements for simplicity of illustration.

Figure 3A:
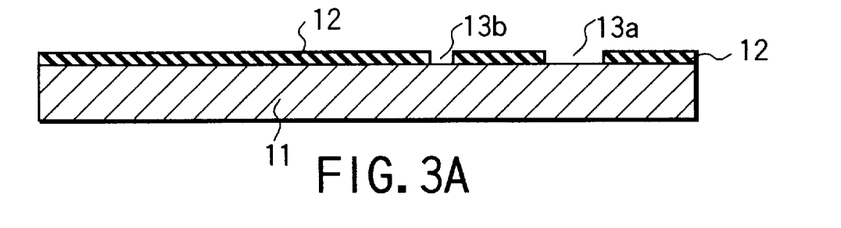
FIGS. 3A–3E show the modification of the manufacturing steps shown in FIGS. 2A–2D.

At first, the photosensitive resin 12 is applied to the surface of the dummy substrate 11, and exposed to light to form the holes 13a and 13b in which the through electrodes (via conductors) are formed, as shown in FIG. 3A. The specific method used to form them is the same as that shown in FIG. 2A.

Figure 3B:
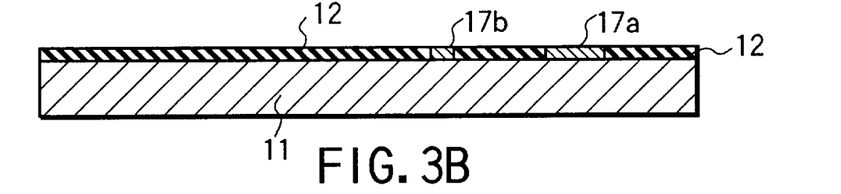

Next, as shown in FIG. 3B, an electroplating is performed to form the through electrodes 17a and 17b inside the holes 13a and 13b by applying an electric current from the dummy substrate 11. The metal material such as nickel, copper, gold, silver, or solder is used to form the through electrodes 17a and 17b by the electroplating.

Figure 3C:
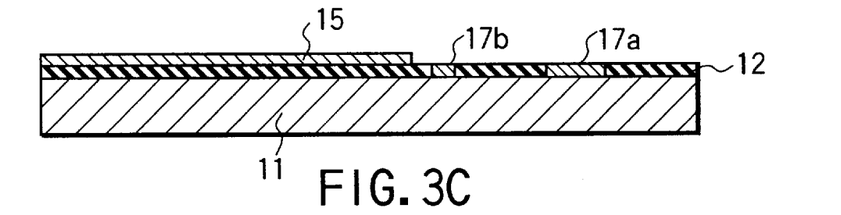

Subsequently, as shown in FIG. 3C, transparent conductive material is deposited on an entire surface thereof by a deposition or sputtering technique, and patterned to form the pixel electrode 15. Similarly to the example shown in FIG. 2C, such a material as indium tin oxide, tin oxide, zinc oxide, or tin zinc oxide, is used as the transparent conductive material.

Figure 3D:
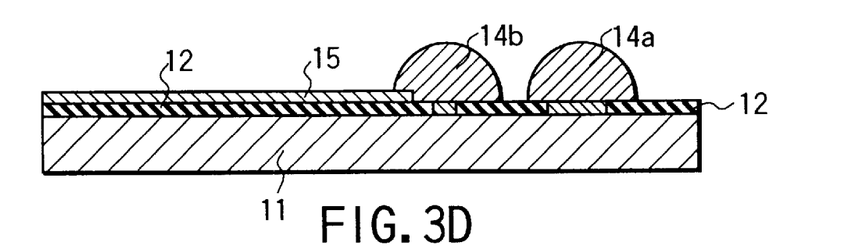

Next, the bump 14a connected to the through electrode 17a and the bump 14b connected to the through electrode 17b are formed, as shown in FIG. 3D. The bumps 14a and 14b may be formed of metal material such as nickel, copper, gold, silver, or solder. In this time, the solder plating may be performed on the surface of the bumps 14a and 14b, similarly to the example shown in FIG. 2B.

Figure 3E:
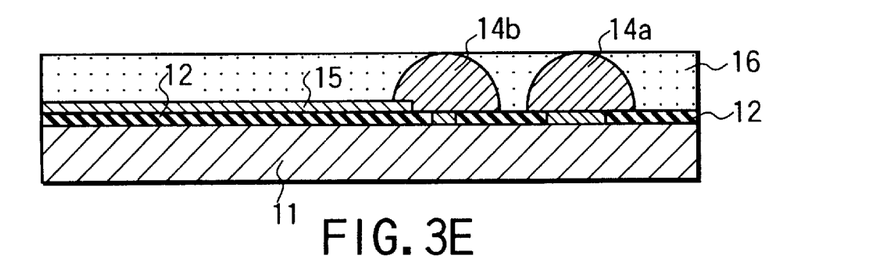

As shown in FIG. 3E, the liquid crystal layer 16 is formed thereafter. The liquid crystal layer 16 is formed in the same manner as described for the example shown in FIG. 2D.

As described above, the semifinished substrate having the bumps 14a and 14b and the liquid crystal layer 16 is formed as shown in FIG. 3E.

Next, the steps subsequent to the step shown in FIG. 2D will be described with reference to FIGS. 2E–2H below. It goes without saying that these subsequent steps can be also applied to the method shown in FIGS. 3A–3E.

At first, a substrate 41, having output terminals (source/drain terminals) 42a, 42b, and 42c of three TFTs which are used as switching elements and a reflection pixel electrode 45 connected to the output terminal 42c, is adhered to the dummy substrate 11 formed in the steps shown in FIGS. 2A–2D to have the elements such as the liquid crystal layer 16. Prior to the adhesion of the substrates, resin for adhering the substrates is applied to the outer periphery of a region in which the liquid crystal layer 16 is formed by printing, for example thereafter the substrates are adhered to each other.

Figure 2E:
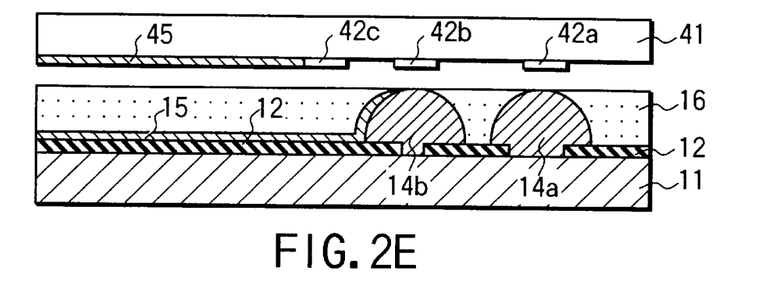

The output terminals 42a, 42b, and 42c of the TFTs are not always arranged on the same cross section as shown in FIG. 2E (see FIG. 1), but they are illustrated to be arranged on the same cross section to simplify the following description.

The reflection pixel electrode is formed on the substrate 41 having the TFTs, and thus the substrate 41 needs not to be formed of transparent material. However, an opposite substrate 31 is formed of glass, and it is thus preferable to form the TFT substrate of glass in order to make the thermal expansion coefficients of the substrates equal.

To adhere the substrates, the adhesive resin having good adhesion to the photosensitive resin 12 is preferably used: thermosetting resin such as epoxy resin; urethane resin; unsaturated polyester; or acrylic resin. In such thermosetting resin, the curing shrinkage occurs and thus the resin can be easily released.

Figure 2F:
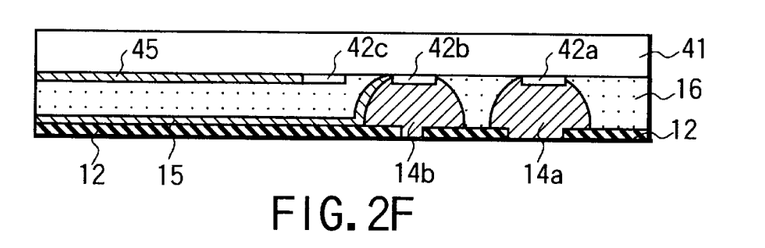

After the substrates are adhered to each other, the dummy substrate 11 are peeled off from the TFT substrate 41. By peeling the dummy substrate off, the bumps 14a and 14b are left and coupled to the output terminals 42a and 42b of the TFTs, respectively, as shown in FIG. 2F.

Figure 4A:
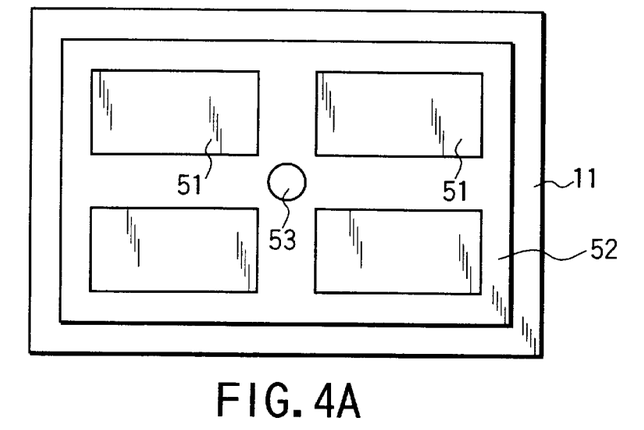
FIG. 4A shows a plane view of an entire surface of the dummy substrate having four liquid crystal panels.

The adhering step and the peeling-off step will be more specifically described below with reference to FIGS. 4A–4C. FIG. 4A shows the entire view of the dummy substrate 11, on which four liquid crystal panels 51 are formed at the same time. Each of the liquid crystal panels (i.e., liquid crystal forming regions) 51 has pixels, each as shown in FIG. 1, which are arranged in a matrix.

The dummy substrate 11 and the TFT substrate 41 are introduced into the apparatus for adhering the substrates by applying pressure and heat thereto under a reduced pressure. The substrates are aligned to each other, as shown in FIG. 4B. After the pressure in the apparatus is reduced, the substrates 11 and 41 are applied with a pressure to be adhered to each other. The applied pressure is preferably set at 10 torr or less at which the no bubble remains at the adhered face. It is preferable for the adhered substrates to be applied with the atmospheric pressure when the adhered substrates are taken out from the apparatus. The inner pressure of the apparatus is thus set at 1 atmospheric pressure or less.

Figure 4B:
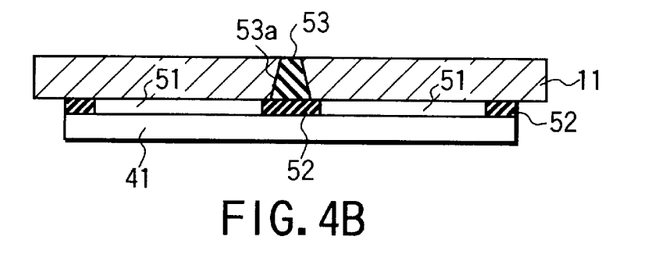
FIG. 4B is a sectional view showing the connection state of the dummy substrate and the TFT substrate.
Figure 4C:
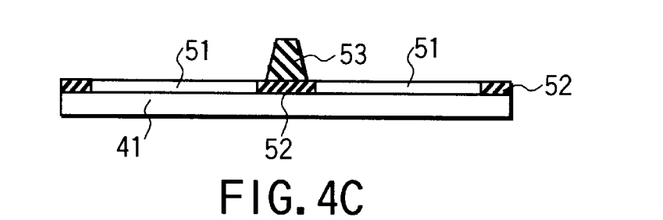
FIG. 4C is a sectional view showing the state after the dummy substrate is peeled off from the device shown in FIG. 4B.

As shown in FIGS. 4A and 4B, the dummy substrate 11 has a coaxially tapered hole 53a is formed at the central portion, i.e., the central portion of the region other than that having pixels and the like. The tapered hole 53a is filled with a plug 53 as a wedge such that the upper face of the plug 53 and the surface of the dummy substrate 11 are located on the same plane. In this manner, the substrates 11 and 41 are adhered to each other by the adhesive resin 52.

Thereafter, the plug 53 is applied with pressured air, then only a small portion of the dummy substrate 11 is peeled off. The pressured air is introduced into the inside of the adhered substrates from the gap formed by the peeling, to completely peel only the substrate 11, as shown in FIG. 4C. The plug 53 is taken away after the substrate 11 is peeled off, thereby the TFT substrate added with the element such as liquid crystal layer 16 can be obtained. Though the diameter of the tapered hole may not specifically determined, the narrower the adhering face thereof is, the easier the process can be performed after the substrate 11 is removed. If the tapered hole has a diameter of 5 mm or more (though suitable diameter will vary in accordance with the thickness of the substrate), the substrate 11 can be easily peeled off.

Figure 5:
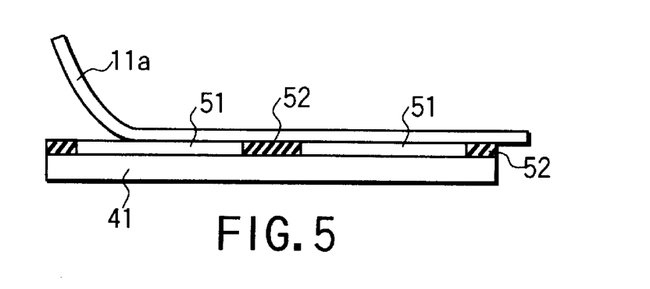
FIG. 5 shows the other example of the peeling-off method of the dummy substrate.

The dummy substrate peeling-off step can be performed by the other method than that described above, as will be described below with reference to FIG. 5. According to this method, a dummy substrate 11a having a thickness of 1 mm or less is used to peel the substrate 11 off by curving it without performing the peeling by the pressured air. If the dummy substrate cannot be easily peeled off with this method, the dummy substrate can be applied with vibration. The peeling off of the dummy substrate can be more facilitated by 1) slicing the adhered end face a little using a blade to curve the end; 2) applying vibration; or 3) applying vibration to the curved end. The thickness of the dummy substrate 11a, which is determined by the flatness of the dummy substrate 11a and the curving degree of the dummy substrate, is preferably around 0.1–1 mm.

The bumps and the pads (output terminals) of the TFTs are pressed by the atmospheric pressure to be connected to each other since they were adhered under a reduced pressure. The liquid crystal capsules around the bumps also fix the bumps since the liquid crystal capsules are adhered to each other to cover the surroundings of the bumps. In addition, the adhesive resin around the liquid crystal panel 51 shrinks when it is cured. The liquid crystal layer will also shrink when it is cooled down since the liquid crystal layer is adhered at a state where it is expanded by the heat applied to the adhesive resin to harden it. Accordingly, the bumps and the pads of the TFTs are connected with a pressure being applied.

If the connection failures (disconnections) occur between the bumps and the pads, a post process may be performed to restore the connection failures by respectively heating the connected portions with a laser beam or the like.

Figure 2G:
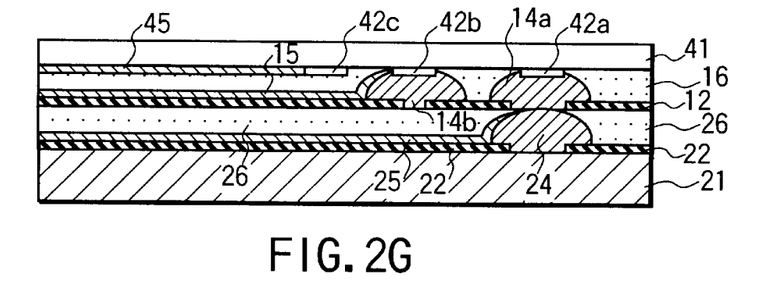

In this manner, after one of the liquid crystal layers as the first layer is stacked on the TFT substrate 41, the semifinished substrate as the second layer is adhered thereto according to the same method as described before. As shown in FIG. 2G, the semifinished substrate as the second layer has a dummy substrate 21, photosensitive resin layer 22, bump 24, pixel electrodes 25, liquid crystal layer 26 and the like, and formed by the same method as the semifinished substrate as the first layer shown in FIGS. 2A–2D.

Unlike the first layer, the semifinished substrate as the second layer, has only one bump 24 since the bump is connected to only the bump 14a in the first layer. In this manner, the bump 14a in the first layer and the bump 24 in the second layer are stacked to be connected, thereby the pixel electrode 25 is connected to the pad (the output terminal) 42a of the TFT via these bumps 14a and 24. After adhering is finished, the dummy substrate 21 is peeled off by the same method as shown in FIG. 4B or FIG. 5.

Figure 2H:
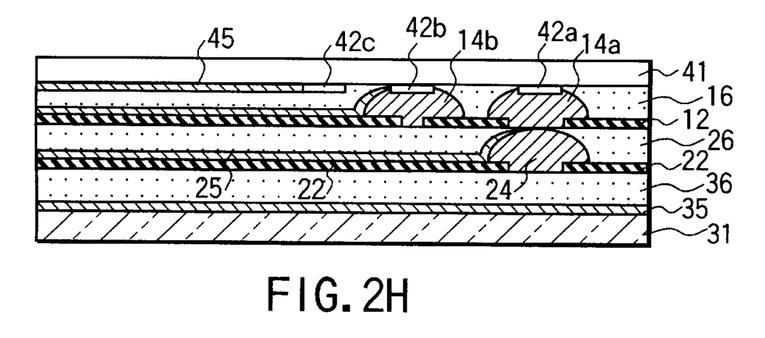

At last, a glass substrate 31 on which a common transparent electrode 35 and a liquid crystal layer 36 are formed is stacked as the third liquid layer by adhering thereto.

As described above, a matrix type liquid crystal display panel comprising three liquid crystal layers 16, 26, and 36 respectively containing the liquid crystal capsules added with magenta, cyan, or yellow dichromatic pigment is formed.

By decreasing the temperatures of the heat applied to the substrates 11, 21, and 31 in order, the liquid crystal panel can be formed without decreasing the pressure applied to connect the bump and the TFT pad.

In the liquid crystal display device formed as described as above, the resin layers 12 and 22 as the barriers of the liquid crystal layers 16, 26, and 36 are formed thin, and thus a pixel electrode needs not to be provided to both sides of each of the resin layers 12 and 22. With this structure, the liquid crystal layers 16, 26, and 36 can be driven by applying the voltages from the pixel electrodes holding each liquid crystal layers therebetween: the liquid crystal layer 16 can be driven by the pixel electrode 45 and the pixel electrode 15, the liquid crystal layer 26 can be driven by the pixel electrode 15 and the pixel electrode 25, and the liquid crystal layer 36 can be driven by the pixel electrode 25 and the common electrode 35.

In the above example, the number of the liquid crystal layers given to the device is three, but is not limited thereto. The number of the liquid crystal layers can be arbitrarily changed in necessity, if the number is more than one. Further, the modification such as the replace of one of the liquid crystal layers with an insulating layer, for example, can be performed.

More specific embodiments of the present invention will be described below.

The First Embodiment

At first, a dummy substrate 11 is formed of a tool steel having a thickness of 0.15 mm, and has a tapered hole in which the through electrode is formed at a central portion. Then, a plug 53 is provided to the tapered hole 53a, and the surface of the dummy substrate is processed to be planarized (see FIG. 4A). Subsequently, the processes such as the hardening and polishing are performed to more planarize the surface. In this time, the surface of the plug is covered with fluoric resin to be easily released when it is removed, and the surface of the substrate is covered with nickel plating. After the plating, the substrate is planarized and mirror-finished.

A pixel forming region 51 (see FIG. 4A) on the surface of the dummy substrate 11 formed in this manner is applied with photosensitive polyimide 12 of 2 $\mu$m thick. After exposing and developing the photosensitive polyimide 12, the dummy substrate 11 is applied with heat, whereby the resin is hardened to form through holes 13a and 13b for forming electrodes (see FIG. 2A).

Next, the exposed surface of the substrate at the through holes 13a and 13b is electroplated with solder by using the dummy substrate 11 as an electrode to obtain bumps 14a and 14b (see FIG. 2B). Then, spacer resin balls, each having a diameter of 10 $\mu$m are dispersed on the surface of the substrate and the resultant top surface is polished, whereby the height of the bumps 14a and 14b are adjusted to 10 $\mu$m.

Further, an ITO (Indium Tin Oxide) film is deposited on the surface of the substrate 11 as a transparent electrode having a thickness of 50 nm by sputtering. Subsequently, the substrate 11 is applied with photoresist (not shown), and exposed to light to be developed. With use of the resist mask, the ITO film is etched to form a pixel electrode 15 (FIG. 2C). Then, the liquid crystal microcapsules are printed with use of a metal mask, and heated at 130° C. to make the capsules adhere to each other. In this manner, a liquid crystal layer 16 is formed (FIG. 2D).

Next, epoxy resin 52 is screen-printed at the outer periphery of the substrate, and made to be in a B stage condition as being tack-free at a room temperature, whereby a first liquid crystal substrate comprising the dummy substrate 11, pixel electrode 15, bumps 14a and 14b, liquid crystal layer 16 and so forth is obtained. The same steps are performed to form a second liquid crystal substrate having one less bumps than that of the first liquid crystal substrate.

Another ITO film of 50 nm thick is deposited as a transparent electrode on a glass substrate 31 by sputtering, and the liquid crystal microcapsules are applied thereto, then the heat treatment is performed to obtain a film as a liquid crystal layer formed from the liquid crystal microcapsules. Subsequently, epoxy resin is printed on the outer periphery of the substrate and is turned into B stage, whereby the third liquid crystal layer is finished.

The liquid crystal layers formed as described above contain magenta, cyan, and yellow dichromatic pigments, respectively.

Next, the first liquid crystal substrate and a TFT substrate 41 which is formed in advance are introduced into a vacuum heating and high-pressure apparatus to be aligned with and stacked on each other (FIG. 2E). Thereafter, the temperature of the inner side of the apparatus is raised upto 150° C. and the inner pressure is reduced to 1 torr. The first liquid crystal substrate and the TFT substrate are applied with a pressure of 0.8 Kg/cm$^2$ under the reduced pressure for 15 minutes to be adhered to each other.

The adhered substrates are taken out from the apparatus to be cooled down to a room temperature, and then the wedge plug 53 is applied with nitrogen gas of 5 Kg/cm$^2$ from backward of the first liquid crystal substrate, whereby only the first dummy substrate 11 is peeled off (see FIG. 2F). After removing the plug 53 provided on the surface of the liquid crystal layer side of the resultant structure, the connections between pads of the TFT and the bumps are checked. If there is any disconnection, the spot at which the disconnection occurs is concentratedly heated with use of laser to securely connect a pad of the TFT and the bump.

Next, the second liquid crystal substrate is adhered to the first liquid crystal layer by applying heat and a pressure under the reduced pressure atmosphere (see FIG. 2G). The temperature and time for applying the pressure are set at 135° C. and 30 minutes. The other conditions are set at the same as those of the adhesion step of the first substrate and the TFT substrate. Next, if any disconnection occurs, the solder at the connected portion where the disconnection occurs is heated by using laser to repair the disconnection.

Next, the third liquid crystal substrate formed of the glass substrate 31 to which liquid crystal microcapsules are applied is stacked on the above-mentioned stacked substrates, and adhered thereto by applying heat and a pressure under the reduced pressure atmosphere, in the same manner as mentioned above (see FIG. 2H). The heat is applied in this step for 40 minutes at 120° C. The amount of the catalyst for hardening the epoxy resin is adjusted in view of various conditions in order to sufficiently harden the resin.

The above-mentioned stacked liquid crystal substrate is formed as a large substrate including four panels. When the stacked liquid crystal substrate is completely formed, the stacked liquid crystal substrate is divided into four substrates. Each of the divided substrates is then provided with a driver IC mounted thereon in a form of TAB (Tape Automated Bonding). When the opposing electrodes of each of the three liquid crystal layers was applied with a voltage, a good color display having a contrast of 3:1 was obtained.

The Second Embodiment

At first, a stainless steel plate having a thickness of 0.1 mm is plated with nickel, and then mirror-finished. The surface of the dummy substrate 11 formed in this manner is applied with photosensitive polyimide 12 of 2 μm thick. After exposing and developing the photosensitive polyimide 12, the dummy substrate 11 is applied with heat, whereby the resin is hardened to form through holes 13a and 13b for forming electrodes (see FIG. 2A).

Thereafter, the surface of the dummy substrate is cleaned by acid and immersed into an electroless nickel plating solution to form nickel bumps 14a and 14b thereon. Further, an ITO (Indium Tin Oxide) film is deposited on the surface of the substrate 11 as a transparent electrode having a thickness of 50 nm by sputtering. Subsequently, the substrate 11 is applied with photoresist (not shown), and exposed to light to be developed. With use of the resist mask, the ITO film is etched to form a pixel electrode 15 (FIG. 2C).

Then, the liquid crystal microcapsules are printed with use of a metal mask, and heated at 130° C. to make the capsules adhere to each other. In this manner, a liquid crystal layer 16 is formed (FIG. 2D).

Next, epoxy resin 52 is screen-printed at the outer periphery of the substrate, and made to be in B stage as being tack-free at a room temperature, whereby the first liquid crystal substrate comprising the dummy substrate 11, pixel electrode 15, bumps 14a and 14b, liquid crystal layer 16 and so forth is obtained. The same steps are performed to form the second liquid crystal substrate having one less bumps than that of the first liquid crystal substrate layer.

Another ITO film of 50 nm thick is deposited as a transparent electrode on a glass substrate 31 by sputtering, and the liquid crystal microcapsules are applied thereto, then the heat treatment is performed to obtain a film as a liquid crystal layer formed of the liquid crystal microcapsules. Subsequently, epoxy resin is printed on the outer periphery of the substrate and is made into B stage, whereby the third liquid crystal layer is finished.

The liquid crystal layers formed as described above contain magenta, cyan, and yellow dichromatic pigments, respectively.

Next, the first liquid crystal substrate and a TFT substrate 41 which is formed in advance are introduced into a vacuum heating and high-pressure apparatus to be aligned with and stacked on each other (FIG. 4B). The temperature of the inner side of the apparatus is then raised upto 150° C. and the inner pressure is reduced to 1 torr. The first liquid crystal substrate and the TFT substrate are applied with a pressure of 0.8 Kg/cm$^2$ under the reduced pressure for 15 minutes to be adhered to each other. In this manner, the TFT substrate 41 and the first liquid crystal substrate are adhered to each other.

After taking the adhered substrates out from the apparatus to be cooled down to a room temperature, the end of the stainless steel plate is coupled with the vibrator to curve the stainless steel plate by applying small vibration thereto. In this manner, only the first dummy substrate 11 is peeled off (see FIG. 4C). When the connection between the first liquid crystal substrate and the TFT substrate 41 was checked thereafter, no disconnection was found.

Next, the second liquid crystal substrate is formed in the same manner as the first liquid crystal substrate and adhered to the first liquid crystal layer by applying heat and a pressure under the reduced pressure atmosphere. The temperature and time for applying the pressure are set at 135° C. and 30 minutes. When the connection between the first liquid crystal layer and the second liquid crystal substrate was checked, no disconnection was found.

Next, the third liquid crystal substrate formed of the glass substrate 31 to which liquid crystal microcapsules are applied is stacked on the above-mentioned stacked substrates, and adhered thereto by applying heat and a pressure under the reduced pressure atmosphere, in the same manner as described above. The heat is applied in this step for 40 minutes at 120° C. The amount of the catalyst for hardening the epoxy resin is adjusted in view of various conditions in order to fully harden the resin.

The above-mentioned stacked liquid crystal substrates is formed as a large substrate including four panels. When the stacked liquid crystal substrate is completely formed, the stacked liquid crystal substrate is divided into four substrates. Each of the divided substrates is then provided with a driver IC mounted thereon with use of the TAB (Tape Automated Bonding) technique. When each couple of the opposing electrodes with respect to the three liquid crystal layers was applied with a voltage, a good color display having a contrast of 3:1 was obtained.

The Third Embodiment

At first, a stainless steel plate having a thickness of 0.1 mm is plated with nickel, and then mirror-finished. The surface of the dummy substrate 11 formed in this manner is applied with photosensitive polyimide 12 of 2 $\mu$m thick. After exposing and developing the photosensitive polyimide 12, the dummy substrate 11 is applied with heat, whereby the resin is hardened to form through holes 13$a$ and 13$b$ for forming electrodes (see FIG. 3A).

Thereafter, copper is electroplated to have the same thickness of the photosensitive polyimide, and the surface of the dummy substrate is polished to be planarized (see FIG. 3B). Further, an ITO (Indium Tin Oxide) film is deposited on the surface of the resultant substrate 11 as a transparent electrode having a thickness of 50 nm by a sputtering technique. Subsequently, the resultant substrate 11 is applied with photoresist and exposed to light to be developed. With use of the resist mask, the ITO film is etched to form a pixel electrode 15.

Thereafter, photoresist is further applied thereon. The photoresist is exposed to light and developed to form an opening pattern, and bumps 14$a$ and 14$b$ are formed by an electroless plating technique (see FIG. 3D). Then, liquid crystal microcapsules are applied thereto, and heated at 130° C. to make the capsules adhere to each other. In this manner, a liquid crystal layer 16 is formed (FIG. 3E).

Next, epoxy resin 52 is screen-printed at the outer periphery of the substrate, and made to be in B stage as being tack-free at a room temperature, whereby the first liquid crystal substrate comprising the dummy substrate 11, pixel electrode 16, bumps 14$a$ and 14$b$, liquid crystal layer 16 and so forth is obtained (FIG. 4A). The same steps are performed to form the second liquid crystal substrate having one less bumps than that of the first liquid crystal substrate layer.

Another ITO film 35 of 50 nm thick is deposited as a transparent electrode on a glass substrate 31 by a sputtering technique, and liquid crystal microcapsules are applied thereto, then a heat treatment is performed to obtain a film as a liquid crystal layer formed of the liquid crystal microcapsules. Subsequently, epoxy resin is printed on the outer periphery of the substrate and is made into B stage, whereby the third liquid crystal layer is finished.

The liquid crystal layers formed as described above contain magenta, cyan, and yellow dichromatic pigments, respectively.

Next, the first liquid crystal substrate and a TFT substrate which is formed in advance are introduced into a vacuum heating and high-pressure apparatus to be aligned with and stacked on each other (FIG. 4B). The temperature of the inner side of the apparatus is then raised upto 150° C. and the inner pressure is reduced to 1 torr. The first liquid crystal substrate and the TFT substrate are applied with a pressure of 0.8 Kg/cm$^2$ under the reduced pressure atmosphere for 15 minutes to be adhered to each other. In this manner, the TFT substrate and the first liquid crystal substrate are adhered to each other (FIG. 2E).

After taking the adhered substrates out from the apparatus to be cooled down to a room temperature, the end of the stainless steel plate is coupled with the vibrator to curve the stainless steel plate by applying small vibration thereto. In this manner, only the first dummy substrate 11 is peeled off (see FIG. 2F). When the connection between the first liquid crystal substrate and the TFT substrate was checked, no disconnection was found.

Next, the second liquid crystal substrate is formed in the same manner as the first liquid crystal substrate and adhered to the first liquid crystal layer by applying heat and a pressure under the reduced pressure atmosphere (see FIG. 2G). The temperature and time for applying the pressure are set at 135° C. and 30 minutes. When the connection between the first liquid crystal layer and the second substrate was checked, no disconnection was found.

Next, the third liquid crystal substrate formed of the glass substrate 31 to which liquid crystal microcapsules are applied is stacked on the above-mentioned stacked substrates, and adhered thereto by applying heat and a pressure under the reduced pressure atmosphere, in the same manner as described above. The heat is applied in this step for 40 minutes at 120° C. The amount of the catalyst for hardening the epoxy resin is adjusted in view of various conditions in order to fully harden the resin.

The above-mentioned stacked liquid crystal substrate is formed as a large substrate including four panels. When the stacked liquid crystal substrate is completely formed, the stacked liquid crystal substrates is divided into four substrates. The divided substrates are each provided with a driver IC mounted thereon with use of a TAB (Tape Automated Bonding) technique. When each couple of the opposing electrodes with respect to the three layers of liquid crystal was applied with a voltage, a good color display having a contrast of 3:1 was obtained.

As described above, according to the first aspect of the present invention, switching elements are provided on only one substrate, and the liquid crystal layers are separated from each other by insulating layers. Each of the pixel electrodes formed between the layers is connected to an output terminal of the switching element through the bump electrodes provided to the respective liquid crystal layers. Therefore, according to the first aspect of the present invention, the liquid crystal display device capable of being manufactured with ease and having high reliability is realized.

Next, the basic manufacturing method of the liquid crystal display device according to the second aspect of the present invention will be described below. According to this manufacturing method, the first and second liquid crystal sub-units are coupled with each other after forming them independently.

Figure 6A:
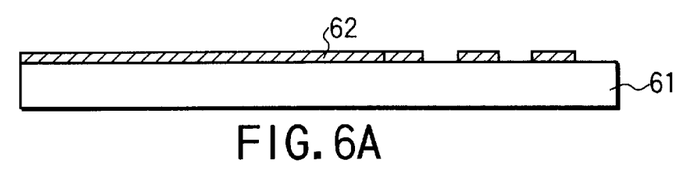
FIGS. 6A–6G are sectional views of one pixel of the first subunit of the liquid crystal display device according to the second aspect of the present invention, which show the first substeps of the basic manufacturing steps of the device, in order.

A reflective pixel electrode 62 as the first liquid crystal sub-unit is formed on a TFT substrate 61 (see FIG. 6A). The TFT substrate needs not to be transparent, but is preferably formed of glass to equalize the thermal expansion coefficient thereof to that of the second liquid crystal sub-unit substrate (described later) which is formed of glass. The reflection pixel electrode is formed of the material having good reflectivity, such as aluminum or nickel. When the via conductor is formed by an electroplating technique, the via conductor preferably has different etching characteristics from that of copper used as an electrode in the electroplating process since the via conductor will be submitted to the selective etching process later.

Figure 6B:
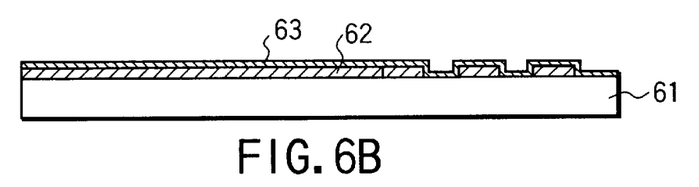
Figure 6C:
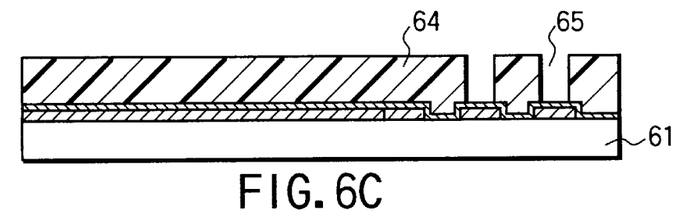
Figure 6D:
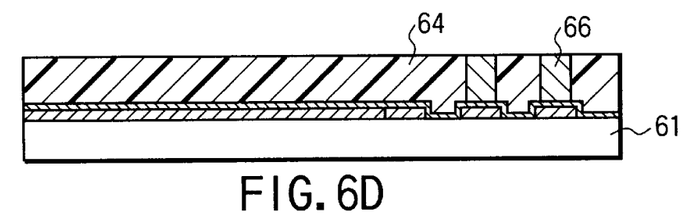

Copper is deposited on the surface of the resultant substrate to form an electroplating electrode 63 (FIG. 6B). Photoresist 64 is applied thereon and exposed to light to form via holes 65 (FIG. 6C). Subsequently, via conductors 66 are formed in the via holes by an electroplating technique (FIG. 6D). The via conductors are preferably formed of material such as nickel or gold, which can be etched selectively from the copper electrode.

Figure 6E:
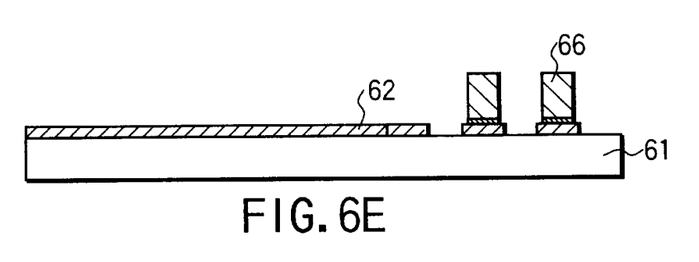

The via conductors formed by the electroplating technique do not always have the same height, and thus is polished together with the applied photoresist before removing the photoresist. When the via conductors are made even by the polishing, the photoresist is removed. After removing the photoresist, the copper used in the electroplating process as an electrode is removed by an etching technique (FIG. 6E).

According to another method, the photoresist may be applied after the reflection pixel electrode is formed, and may be exposed and developed to form via holes. The formed via holes are then filled with conductive resin. The filling process is performed by introducing conductive paint into the holes with use of squeegee or screen. The via holes can be also filled with the conductive material in the other manner: the pressure in the processing apparatus is reduced immediately after the conductive paint is introduced, whereby the air is exhausted from the holes. Then, the paint is introduced, the pressure in the apparatus is reduced, and the pressure is applied to the device. By repeating these steps, bubbles can be completely removed from the holes. After the resin in the holes is hardened, the hardened resin is polished with use of a buff or the like to flatten the surface. The photoresist is removed thereafter.

The substrate having the via conductors formed in this manner is then applied with liquid crystal capsules 67 which contain a dichromatic pigment and are dispersed in water, by printing with use of a metal mask. The liquid crystal capsules 67 are then dried (see FIG. 6F). When the film formed of the capsules is mechanically weak, resin emulsion such as polyester emulsion, epoxy emulsion, or aclyl emulsion, which is dispersed in water, is applied to the surface of the film, and dried to form a protection film 68 (see FIG. 6F). The resin emulsion is dispersed in water, and is not formed on the via conductor since the surface of the via conductor is hydrophobic.

Figure 6F:
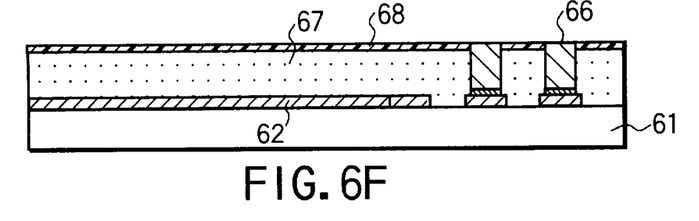
Figure 6G:
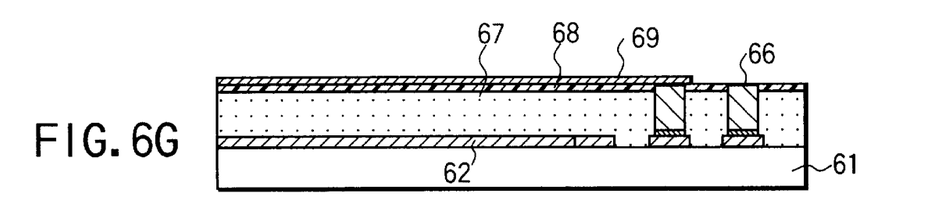

The transparent electrode 69 is then formed of an ITO film or the like by printing or evaporation thereon (FIG. 6G). When the electrode is formed by evaporation, the etching for dividing the pixel or mask evaporation needs to be performed. The evaporation technique using a mask is preferred to the printing technique since the mask evaporation does not involve an immersion of the etching solution to the liquid crystal layers. In this manner, the first sub-unit is formed.

Figure 7A:
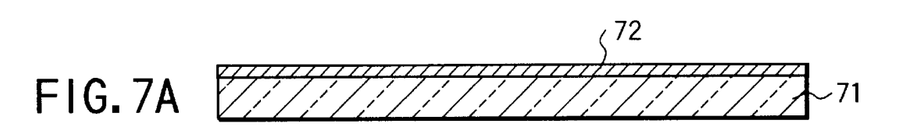
FIGS. 7A–7E are sectional views of one pixel of the first subunit of the liquid crystal display device according to the second aspect of the present invention, which show the second substeps of the basic manufacturing steps of the device, in order.

Next, a transparent electrode 72 formed of a ITO film is formed on a transparent substrate 71 to form the second sub-unit (FIG. 7A). Then, liquid crystal capsules 74 containing a dichromatic pigment are applied thereon by printing and dried to form a film (see FIG. 7B). When the film formed of the capsules is mechanically weak, resin emulsion such as polyester emulsion, epoxy emulsion, or acryl emulsion, which is dispersed in water, is applied to the surface of the film, and dried to form a protection film 74 (see FIG. 6F). The resin emulsion is dispersed in water, and is not formed on the via conductor since the surface of the via conductor is hydrophobic.

Figure 7B:
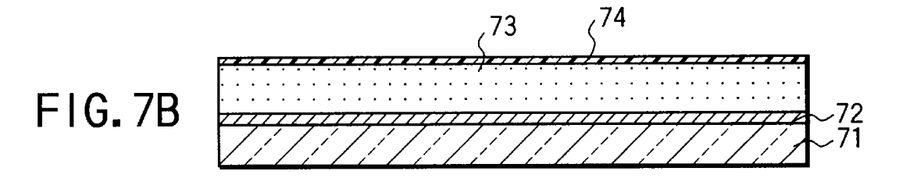
Figure 7C:
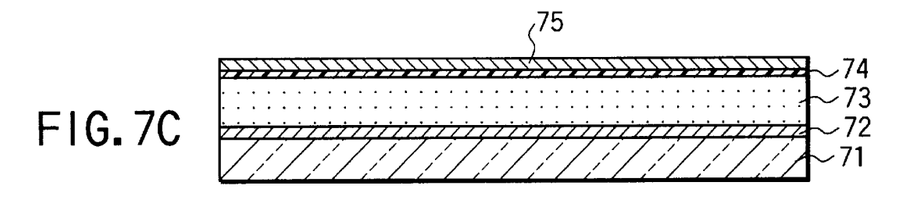

The transparent electrode 75 is then formed of an ITO film or the like by printing or evaporation thereon (FIG. 7C). When the electrode is formed by evaporation, the etching for dividing the pixel or mask evaporation needs to be performed. The deposition technique using a mask is preferred to the printing technique since the mask evaporation does not involve an etching and so an immersion of the etching solution to the liquid crystal layers.

Figure 7D:
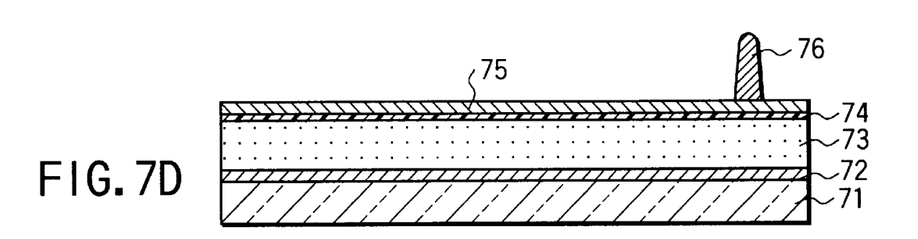

Subsequently, the via conductors are formed by printing conductive resin (see FIG. 7D). The conductive resin preferably includes thermoplastic resin. When thermoplastic resin is used as the conductive resin, the resin in B-stage needs to be used. The resin needs to be maintained in B-stage till the first and second sub-units are adhered to each other.

Figure 7E:
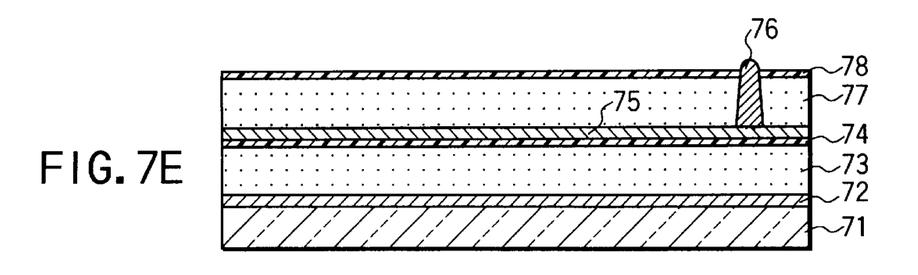

Then, liquid crystal capsules 74, which contain a dichromatic pigment and are dispersed in water, are printed with use of a metal mask and dried to form a film (see FIG. 7E). The liquid crystal capsule layer is printed to have substantially the same height as that of the via conductors 76. After the printing, the liquid crystal capsules adhere to each other by drying, and the thickness of the liquid crystal layer will be decreased by about 20%. Due to the decrease of the liquid crystal layer in thickness, the tip of the via conductor will be protruded from the surface of the liquid crystal layer. The via conductor is hydrophobic, and thus the liquid crystal capsules will not be adhered thereto.

Resin emulsion such as polyester emulsion, epoxy emulsion, or acryl emulsion, which is dispersed in water, is applied to the liquid crystal layer by flow coating, and dried to form an adhesion film 78. The via conductor is hydrophobic, and thus repels the resin emulsion dispersed in water, with the result that the electric connection of the via conductor will not be damaged. In this manner, the second sub-unit is formed.

Figure 8A:
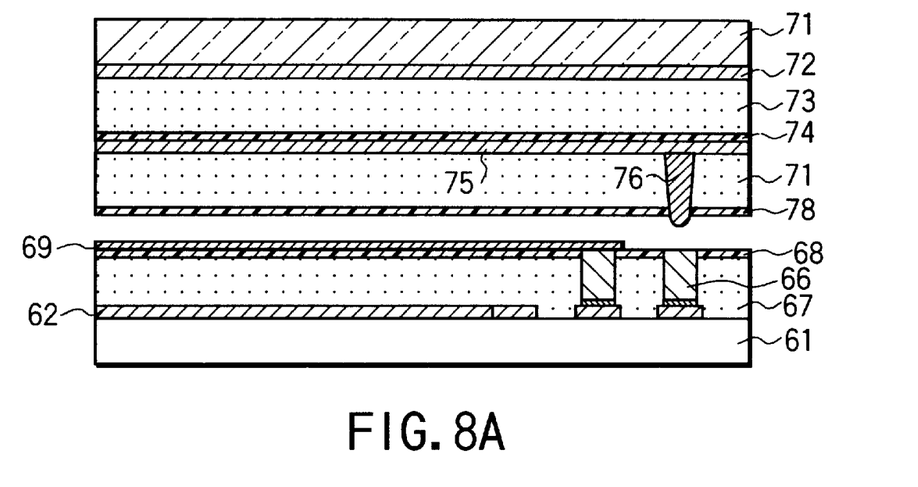
FIGS. 8A and 8B are sectional views of one pixel of the liquid crystal display device, which shows the first half step and the second half step of the method of adjoining the first and second subunits, respectively.
Figure 8B:
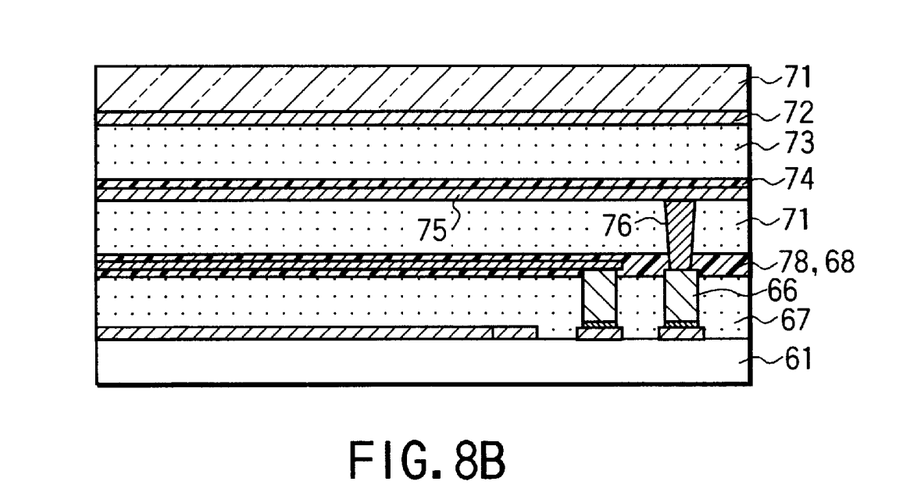

Next, the first sub-unit formed at first and the second sub-unit are coupled to each other (see FIG. 8A), and adhered to each other by applying heat under a reduced pressure. In this time, the conductive resin via conductor 76 is softened due to the applied heat and connected to the corresponding via conductor 66 in the first sub-unit (see FIG. 8B). In this connection, the liquid crystal capsule layers 67, 73, and 77 function as springy members to urge the via conductor connected portions to be pressed. With this structure, undesirable disconnection due to the thermal expansion will not easily occur, and high reliability of the connection is obtained.

The dichromatic pigments contained in three layers are magenta, cyan, and yellow, respectively. More specific description of the liquid crystal device of the present invention will be presented below.

The Fourth Embodiment

A substrate is formed of a TFT substrate 61 applied with a nickel reflection pixel electrode 62 (see FIG. 6A). Copper is evaporated thereon as an electroplating electrode 63 (see FIG. 6B). Then, photoresist 64 is applied thereon by 15 μm and then exposed to light to be developed.

The electroplating of nickel is performed in the via hole 65 such that the via conductor formed in the hole has a height of 10 μm at lowest. Then, the surface of the substrate is polished to be planarized with use of a buff, thereby to set the height of the via conductor 66 at 10 μm (see FIG. 6D).

The substrate having the via conductors formed in this manner is applied with liquid crystal capsules 67 which contain a cyan dichromatic pigment and are dispersed in water, after photoresist 64 is removed with use of acetone, and dried at 100° C. for 30 minutes to form a liquid crystal layer 67 having a thickness of 10 μm. ITO paint is printed thereon with use of a metal mask, and dried at 100° C. for 30 minutes to form a transparent pixel electrode 69 having a thickness of 100 nm. In this manner, the first sub-unit is formed.

Next, an ITO film having 100 nm is deposited on the transparent glass substrate 71 by a sputtering technique to form a transparent electrode 72. The liquid crystal capsules which contain a yellow dichromatic pigment is printed and dried at 100° C. for 30 minutes to form a liquid crystal layer 73 having a thickness of 10 μm (see FIG. 7B).

ITO paint is printed thereon with use of a metal mask and dried at 100° C. for 30 minutes to form a transparent electrode 75 having a thickness of 100 nm (see FIG. 7C). The conductive paint in which silver particles are dispersed in epoxy resin is printed thereon with use of a metal mask to form a via conductor 76, and dried at 80° C.(see FIG. 7D).

The liquid crystal capsules which contain a magenta dichromatic pigment and is dispersed in epoxy emulsion, which is dispersed in water, is prepared as a paint. The paint is printed on the substrate and dried at 100° C. for 30 minutes to form a liquid crystal layer 77 having a thickness of 10 μm. Further, an epoxy layer 78 which is turned into B-stage and has a thickness of 1 μm is formed on the surface of the capsule layer (see FIG. 7E). In this time, the height of the via conductor is set such that the tip of the via conductor 76 protrudes through the liquid crystal layer 77 and the epoxy layer 78. In this manner, the second sub-unit is formed.

The first sub-unit prepared in advance and the second sub-unit are aligned with and adhered to each other at 150° C. in vacuum of 1 torr. Subsequently, the pressure applied to the stacked first and second sub-units is returned to the atmospheric pressure, and the sub-units are keep being applied with heat for 30 minutes to harden the epoxy resin. When the liquid crystal display device thus formed was driven, the gray levels of each color was clearly displayed, whereby full-color display can be obtained.

The Fifth Embodiment

The first sub-unit is formed at first in such a manner that a substrate is formed of a TFT substrate 61 provided with an aluminum reflection pixel electrode 62 (see FIG. 6A), and then a dry film is adhered thereto and exposed and developed to form a hole in a via section 65 (see FIG. 6C).

Subsequently, conductive paint is stenciled with use of the dry film as a mask by a squeegee (see FIG. 6D). After a short interval, this substrate is placed under a reduced pressure to remove bubbles in the hole. Then, the conductive resin is stenciled again under the atmospheric pressure. The step of stenciling under the atmospheric pressure and then reducing the pressure to remove bubbles in the hole is repeated three times. The surface of the substrate is polished to planarize the entire surface of the substrate with use of a buff such that the via conductor has a height of 10 μm. After the dry film 64 is removed, drying treatment is performed at 100° C. for 30 minutes to completely dry up the conductive resin 66 (see FIG. 6E).

The substrate formed in this manner is applied with liquid crystal capsules which contain a cyan dichromatic pigment and are dispersed in water, and dried at 100° C. for 30 minutes to form a liquid crystal layer having a thickness of 10 μm (see FIG. 6F). ITO paint is printed thereon with use of a metal mask, and dried at 120° C. for 30 minutes to form a transparent pixel electrode 69 having a thickness of 100 nm. In this manner, the first sub-unit is formed.

Next, the second sub-unit is formed in the following manner: an ITO film having 100 nm is deposited on the transparent glass substrate 71 by the sputtering technique to form a transparent electrode 72 (see FIG. 7B). The liquid crystal capsules which contain yellow dichromatic pigment is printed and dried at 100° C. for 30 minutes to form a liquid crystal layer 73 having a thickness of 10 μm. In the same manner, ITO paint is printed thereon with use of a metal mask and dried at 100° C. for 30 minutes to form a transparent electrode 75 having a thickness of 100 nm (see FIG. 7C).

The conductive paint in which silver particles are dispersed in epoxy resin is printed thereon with use of a metal mask to form a via conductor 76, and dried at 80° C. (see FIG. 7D). The liquid crystal capsules which contain a magenta dichromatic pigment and is dispersed in epoxy emulsion dispersed in water is prepared as a paint. The paint is printed on the substrate so as to fill the via conductor 76 and dried at 100° C. for 30 minutes to form a liquid crystal layer 77 having a thickness of 10 μm. Further, an epoxy layer 78 which is turned into B-stage and has a thickness of 1 μm is formed on the surface of the capsule layer (see FIG. 7E). In this time, the height of the via conductor is set such that the tip of the via conductor 76 protrudes through the liquid crystal layer 77 and the epoxy layer 78. In this manner, the second sub-unit is formed.

The first sub-unit prepared in advance and the second sub-unit are aligned with (see FIG. 8A) and adhered to each other at 150° C. in vacuum of 1 torr. Subsequently, the pressure applied to the stacked first and second sub-units is set at the atmospheric pressure, and the sub-units are kept being applied with heat for 30 minutes to harden the epoxy resin (see FIG. 8B).

When the liquid crystal display device thus formed was driven, the gray level of each color was clearly displayed, whereby full-color display can be obtained.

According to the above-mentioned methods of the present invention, three-layered liquid crystal display element with high reliability can be obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A liquid crystal display device comprising:

a first substrate;

a single common electrode provided for a pixel and formed on a face of the first substrate;

a first liquid crystal layer formed on the first substrate with the common electrode intervening between the first liquid crystal layer and the first substrate;

a first pixel electrode for the pixel formed on the first liquid crystal layer;

a first projection electrode formed above the first liquid crystal layer and connected to the first pixel electrode;

a second liquid crystal layer formed on the first pixel electrode so as to embed the first projection electrode therein while exposing a top surface of the first projection electrode;

a second pixel electrode for the pixel formed on the second liquid crystal layer except for a surrounding portion of the top surface of the first projection electrode;

a second projection electrode formed on the first projection electrode and connected thereto;

a third projection electrode formed above the second liquid crystal layer and connected to the second pixel electrode;

a third liquid crystal layer formed on the second pixel electrode so as to embed the second and the third projection electrode while exposing top surfaces of the second and the third projection electrode;

a second substrate provided on the third liquid crystal layer;

a third pixel electrode for the pixel formed on a face of the second substrate, the face of the second substrate being opposite to the face of the first substrate; and three switching elements provided for the pixel and formed on the face of the second substrate, a first one of the switching elements being connected to the second projection electrode, a second one of the switching elements being connected to the third projection electrode, and the third one of the switching elements being connected to the third pixel electrode;

wherein the first, the second and the third liquid crystal layer is composed of a plurality of microcapsules formed of polymer and adhering to each other, each of the plurality of microcapsules including liquid crystal therein.

2. A liquid crystal display device according to claim 1, further comprising a first insulating layer interposed between the first and the second liquid crystal layer and a second insulating layer interposed between the second and the third liquid crystal layer;

wherein the first projection electrode and the second projection electrode are connected in cascade via a through hole formed in the second insulating layer.

3. A liquid crystal display device according to claim 1, wherein the first liquid crystal layer contains liquid crystals added with a dichromatic pigment of yellow, the second crystal layer contains liquid crystals added with a dichromatic pigment of cyan, and the third liquid crystal layer contains liquid crystals added with a dichromatic pigment of magenta.

4. A liquid crystal display device according to claim 1, wherein the first, the second and the third projection electrode is formed of a metal and shaped in a bump.

5. A liquid crystal display device according to claim 1, wherein the first, the second and the third projection electrode is formed of a metal and shaped in a column.

6. A liquid crystal display device according to claim 1, wherein the first, the second and the third projection electrode is formed of a conductive resin and shaped in a column.

* * * * *